UNITED STATES PATENT OFFICE.

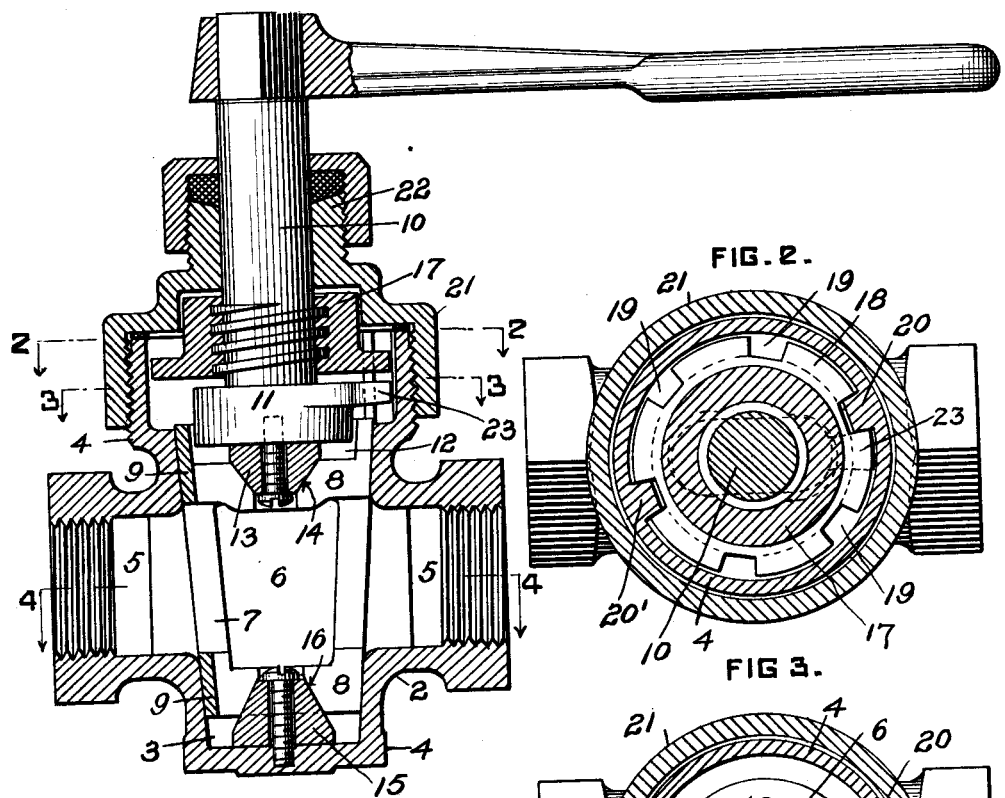

RALPH W. CADMAN, OF EDGEWOOD, PENNSYLVANIA.

VALVE.

1,176,519. Specification of Letters Patent. Patented Mar. 21, 1916.

Application filed October 23, 1914. Serial No. 868,248.

*To all whom it may concern:*

Be it known that I, RALPH W. CADMAN, a citizen of the United States, and resident of Edgewood, in the county of Allegheny and State of Pennsylvania, have invented certain new and useful Improvements in Valves, of which the following is a specification.

This invention relates to a valve which is actuated by a threaded stem, and one object is to provide improved means for adjusting and holding the threaded element through which the stem operates whereby such element is immovably confined by an interlocking connection with its holding means in whatever adjustment it may be placed, the range of adjustment being sufficient to compensate for all wear whereby when the valve becomes worn it is quite as efficient as when new.

As here embodied, the invention includes certain improvements in the plug valve patented to me March 28, 1905, No. 758,854, and, in addition to the novel feature above indicated, includes improved means for connecting the operating stem with the expansible plug; also for stopping the stem when the valve has been fully opened.

In the accompanying drawings, Figure 1 is a sectional elevation of a valve mechanism embodying the invention. Figs. 2, 3 and 4 are sectional plan views, taken on lines 2—2, 3—3, and 4—4, respectively, of Fig. 1. Fig. 5 is a top plan of the plug.

Referring to the drawings, 2 designates the valve casing which is formed with the tapered valve seat 3 which is open to the externally threaded neck-like casing extension 4. Casing 2 may be ported in any desired manner, as here shown being formed with the opposite pipe connection side ports 5. The plug or valve head 6 is formed with through-port 7, the plug being tapered complementary with the seat as shown. The plug is of expansible form as in my former patent, being split longitudinally at 8, the split extending almost through the valve so that the opposed halves thereof are united only at one side above and below port 7 as indicated at 9. While this is the preferred construction for a valve of the type disclosed, it will be understood that the invention is not restricted thereto.

The threaded valve operating stem 10 carries the elongated head 11 which loosely fits within the elongated depression 12 in the larger end of plug 6, and a cone-shaped expander 13 projecting from the inner extremity of the stem fits the deeper coned portion 14 of depression 12. A similar cone-shaped expander 15 projects from the bottom of the valve seat and is embraced by the cone-shaped cavity 16 in the smaller end of the plug.

The threaded stem 10 is operative through the internally threaded sleeve 17 which is adapted to freely enter casing neck 4. The sleeve is formed with peripheral flange 18, and equally spaced notches 19 in the flange are adapted to embrace lug or rib 20 extending inwardly from the open end of neck 4. If desired, a second lug 20' may be arranged within the neck diametrically opposite lug 20. Sleeve 17 is confined in neck 4 by cap 21, and the outer portion of this cap may be in the form of a packing gland 22. Index finger 23 projecting from head 11 is adapted to engage lug 20 and stop rotation of the stem and plug when the latter has been turned to full open position, as in Figs. 1, 2 and 3.

When assembling the parts and before entering the valve stem and sleeve 17 in neck portion 4 of the casing the sleeve is turned to such position on the stem as will cause the valve to be tightly closed by a quarter turn of the stem, and the sleeve is then inserted with its appropriate notches 18 embracing lugs 20 and 21 which prevent rotation, and when cap 21 is applied the sleeve is held against outward movement. When the valve wears sufficiently to permit the stem to turn farther than is necessary for a tight fit with the ports out of register, it is only necessary to remove the stem and sleeve and turn the latter backwardly on the stem or toward its outer end sufficiently to engage the next notches with lugs 20 and 21, and with the parts again assembled in such position the wear is fully taken up by the sleeve, the valve-seating throw of the stem being then no greater than when the valve is new.

The operation of the valve expanding elements 13 and 15 are substantially the same as in my former patent, the inward movement of the stem forcing cone 13 into the valve with the expanding effect and the resulting pressure forcing the valve onto cone 15 with a corresponding expanding action. The loose fit of elongated head 11 in depression 12 provides a lost motion connection between the stem and plug, whereby when opening the valve the initial pressure resulting from the threaded mounting of the stem is relaxed before applying the plug-turning force so that the plug may be turned to full open position with comparative ease, and when fully open the movement is stopped by index finger 23 engaging lug 20, relieving the operator of the necessity of watching the adjustment in order to stop the valve in full open position.

I claim:—

1. The combination of a tapered expansible plug valve having an elongated depression in its upper end, a rotatable valve operating stem, and an elongated head secured to and extending transversely of the stem and adapted to enter the valve depression.

2. The combination of a tapered expansible plug valve having an elongated depression in its larger end, the depression being deepest and of cone form at its center, a valve actuating stem, a head carried by the stem and elongated transversely of the axis of the latter and adapted to enter the plug depression, and a central cone-like projection beneath the head and adapted to enter the corresponding portion of the plug depression.

3. The combination of a valve casing having a valve seat, the casing formed with an open neck portion, a valve, a threaded valve rotating stem, a lug at the inner side of the neck portion and extending inwardly from the open end of the latter, a threaded sleeve through which the stem operates, the sleeve adapted to enter the neck portion of the casing and notched to embrace said lug for holding the sleeve against rotation, means for confining the sleeve in said neck extension, and a lateral projection on the stem adapted to engage said lug for stopping the movement of the stem when the valve is in open position.

4. The combination of a valve body providing a seat, an expansible plug valve rotatable in said seat, a rotatable and axially movable operating stem in interlocking engagement with the valve for rotating the latter, the valve formed with a cone-like depression which intersects an expansible portion of the valve, and a cone-like projection at the inner extremity of the stem which enters said depression and operates to expand the valve through the axial movement of the stem.

5. The combination of a valve body providing a seat, a plug valve rotatable in the seat and split longitudinally for expansion therein, opposite ends of the valve formed with reversely disposed tapered depressions which are intersected by the split in the valve, a cone-like projection within the valve seat and embraced by one of said depressions, a rotatable and axially movable stem operatively engaging the valve for rotating the stem, and a cone-like projection at the inner extremity of the stem and engaging the other of said depressions, whereby expanding pressure is exerted on opposite ends of the valve by rotating the stem.

In testimony whereof I affix my signature in presence of two witnesses.

RALPH W. CADMAN.

Witnesses:
J. M. NESBIT,
F. E. GAITHER.

Copies of this patent may be obtained for five cents each, by addressing the "Commissioner of Patents, Washington, D. C."